United States Patent Office 3,505,423
Patented Apr. 7, 1970

3,505,423
HOMOGENEOUS ALKYLATION OF AROMATICS WITH OLEFINS AND THE CATALYST THEREFOR
Maurice M. Mitchell, Jr., Wallingford, and Edward S. J. Tomezsko, Media, Pa., assignors to Atlantic Richfield Company, Philadelphia, Pa., a corporation of Pennsylvania
No Drawing. Filed Oct. 1, 1968, Ser. No. 764,342
Int. Cl. C07c 3/56
U.S. Cl. 260—671                                       10 Claims

ABSTRACT OF THE DISCLOSURE

Alkylation of aromatics with olefins in a homogeneous catalysis system employing a tungsten hexafluoride-phosphorous trifluoride complex as the novel catalyst.

BACKGROUND OF THE INVENTION

Field of the invention

This invention relates to a method for the alkylation of aromatics with olefins utilizing as the novel catalyst a tungsten hexafluoride-phosphorous trifluoride complex in solution in the reaction mixture.

Prior art

No prior art is known showing tungsten hexafluoride-phosphorous trifluoride and none is known showing the use of these complexes as a soluble catalyst for the alkylation of aromatics with olefins.

Although other homogeneous alkylation catalysts are known, the catalyst of this invention gives substantially complete selectivity for the production of the monoalkyl aryl compounds at room temperature, while the homogeneous catalysts of the prior art require elevated temperatures and extremely critical conditions to reach high selectivity.

SUMMARY OF THE INVENTION

This invention relates to a method for the alkylation of aromatic hydrocarbons with olefins utilizing a novel catalyst which is soluble in the reaction medium. The novel catalyst is a complex of tungsten hexafluoride and phosphorous trifluoride. The alkylation reaction utilizing this catalyst is essentially completely selective for the production of the monoalkyl aromatics at room temperatures.

It is an object of this invention therefore to provide a novel catalyst for the alkylation of aromatics with olefins.

It is another object of this invention to provide a novel catalyst for the alkylation of aromatics with olefins which is soluble in the reaction medium.

It is another object of this invention to provide a method for the alkylation of aromatics with olefins which is essentially completely selective for the production of monoalkylated aromatics.

It is another object of this invention to provide a method for the alkylation of aromatics with olefins utilizing a catalyst soluble in the reaction medium.

Other objects of this invention will be apparent to those skilled in this art from the description of the preferred embodiments which follows and from the claims.

DESCRIPTION OF THE PREFERRED EMBODIMENTS

The monoolefins which can be utilized to alkylate the aromatic hydrocarbons in accordance with the process of this invention can be either branched chain or straight chain and can contain from 2 to 18 carbon atoms.

The aromatic hydrocarbons can be either benzene or the lower alkylated benzenes such as toluene, xylenes, ethyl benzene, propyl benzene, butyl benzene, napthalene or the like. The preferred aromatic, however, is benzene.

The catalyst of this invention is prepared by introducing gaseous tungsten hexafluoride and the gaseous phosphorous trifluoride into a vessel filled with an inert atmosphere such as an argon atmosphere. The mole ratio of tungsten hexafluoride to phosphorous trifluoride is preferably in the range of from 1:1 to 1:10 although somewhat higher mole ratios may be employed. The gases are allowed to react at room temperature for a period of from ½ to 18 hours. Under these conditions a white powder is formed which adheres to the walls of the vessel and constitutes the complex catalyst system. When benzene or other aromatic hydrocarbon is introduced into the system the white powder dissolves into the hydrocarbon. The alkylation reaction is carried out simply by introducing the olefin either as a gas or a liquid depending upon the molecular weight of the olefin into the vessel containing the benzene solution of the catalyst. The alkylation reaction is extremely rapid even at room temperature and the olefin reacts as rapidly as it is admitted into the vessel. The selectivity for production of monoalkylated aromatics is a function of the olefin employed and the mole ratio of the catalyst components, i.e. $WF_6$ to $PF_3$ mole ratio.

It has also been found that the alkylation reaction is unaffected by oxygen or hydrogen and that traces of air can be tolerated during the alkylation reaction.

The following examples are provided to illustrate the invention in greater detail and to provide specific embodiments thereof. These examples should not be construed as limiting however.

EXAMPLE I

Runs were carried out wherein mixtures of tungsten hexafluoride and phosphorous trifluoride were introduced into a reaction tube at room temperature at mole ratios of $WF_6$ to $PF_3$ of 1:1, 1:3 and 1:4.5. These were also compared with a $WF_6$ catalyst without any $PF_3$. They were introduced into an argon atmosphere and thereafter benzene was introduced into the reaction vessel. The olefin was pumped into the benzene solution in the reaction vessel at room temperature and there was obtained the results shown in the table.

TABLE

| Olefin | Percent selectivity* | | | |
|---|---|---|---|---|
| | $WF_6$ | $WF_6:PF_3$ | $WF_6:3PF_3$ | $WF_6:4.5PF_3$ |
| Ethylene | 1.0 | 56.3 | ~60 | |
| Propylene | | 19.1 | 24.2 | |
| Butene-1 | 7.8 | | 2.5 | 61.2 |

* $\frac{\text{wt. olefin converted to alkylate}}{\text{wt. total olefin converted}} \times 100$ These results show the large improvement in selectivity, i.e. ratio of olefin converted to alkylate to total olefin converted, when the optimum mole ratio of catalyst is employed and as compared with tungsten hexafluoride alone.

EXAMPLE II

In order to show that a discrete complex between tungsten hexafluoride and phosphorous trifluoride is catalytically active, a 1:3 mole ratio of tungsten hexafluoride to phosphorous trifluoride was introduced into a reaction vessel in an argon atmosphere at room temperature. This mixture was allowed to stand for 18 hours and white crystals formed on the wall of the reaction vessel. The argon pressure in the reaction vessel was atmospheric and after the introduction of the two gases, tungsten hexafluoride and phosphorous trifluoride, the pressure was approximately 12 p.s.i.g.

At the end of the 18 hours the pressure had again dropped to nearly atmospheric showing the two gases had reacted to form a complex. The small amount of residual gaseous tungsten hexafluoride and phosphorous trifluoride were swept out with argon and benzene was introduced. The crystals on the walls of the vessel dissolved in the benzene. Cis-butene-2 was pumped into the vessel and sec-butyl benzene was formed as fast as the olefin could be pumped into the vessel. The reaction temperature was room temperature, i.e. about 25° C. It was found that the selectivity was 100 percent for the production of the monoalkylated benzene, i.e. sec-butyl benzene.

EXAMPLE III

A run was carried out in the same manner as in Examples I and II with toluene as the aromatic and propylene as the olefin. The catalyst consisted of tungsten hexafluoride and phosphorous trifluoride in a 1:3 mole ratio. There was obtained ortho-, meta- and paracymene in an amount of 51.3 percent ortho-, 12.3 percent meta- and 36.4 percent para-. These ratios differ from those obtained by the use of a conventional catalyst such as aluminum bromide under the same conditions, the ortho- compound being somewhat higher in amount and the meta- isomer somewhat lower.

In another run it was found that butyl chloride would not react to give butyl benzene in the presence of the tungsten hexafluoride-phosphorous trifluoride catalyst. Since conventional catalysts such as aluminum chloride or aluminum bromide catalyze this reaction readily it is clear the catalysts of this invention differ from these conventional catalysts.

As many possible embodiments can be made of this invention without departing from the broad scope thereof, it is to be understood that all matter herein set forth is to be interpreted as illustrative and not as unduly limiting the invention.

We claim:
1. A method for the alkylation of aromatic hydrocarbons with olefins which comprises contacting the olefin with the aromatic hydrocarbon in the presence of a catalyst consisting of tungsten hexafluoride and phosphorous trifluoride.
2. The method according to claim 1 wherein the olefin contains from 2 to 18 carbon atoms and the aromatic is benzene, a lower alkylated benzene or naphthalene.
3. The method according to claim 1 wherein the mole ratio of the tungsten hexafluoride to phosphorous trifluoride is in the range of from 1:1 to 1:10.
4. The method according to claim 1 wherein the olefin is ethylene and the aromatic hydrocarbon is benzene.
5. The method according to claim 1 wherein the olefin is propylene and the aromatic hydrocarbon is benzene.
6. The method according to claim 1 wherein the olefin is butene-1 and the aromatic hydrocarbon is benzene.
7. The method according to claim 1 wherein the olefin is cis-butene-2 and the aromatic hydrocarbon is benzene.
8. The method according to claim 1 wherein the catalyst is dissolved in the aromatic hydrocarbon.
9. The method according to claim 1 wherein the olefin is a straight chain hydrocarbon containing from 2 to 18 carbon atoms, the aromatic hydrocarbon is benzene and the mole ratio of the tungsten hexafluoride to phosphorous trifluoride is in the range of from 1:1 to 1:10.
10. The method according to claim 1 wherein the alkylation reaction is carried out at room temperatures.

References Cited

UNITED STATES PATENTS 2,767,230  10/1956  Brown et al. _____ 260—671

DELBERT E. GANTZ, Primary Examiner

C. R. DAVIS, Assistant Examiner